US010693656B2

(12) United States Patent
Pritchard et al.

(10) Patent No.: US 10,693,656 B2
(45) Date of Patent: Jun. 23, 2020

(54) METHOD AND DEVICE FOR SCANNING FOR DATA PROCESSING DEVICES

(71) Applicant: ARM IP Limited, Cambridge (GB)

(72) Inventors: Andrew John Pritchard, Cambridge (GB); Geraint Luff, Cambridge (GB); Milosch Meriac, Cambridge (GB)

(73) Assignee: ARM IP Limited, Cambridge (GB)

( * ) Notice: Subject to any disclaimer, the term of this patent is extended or adjusted under 35 U.S.C. 154(b) by 280 days.

(21) Appl. No.: 15/532,671

(22) PCT Filed: Nov. 30, 2015

(86) PCT No.: PCT/GB2015/053653
§ 371 (c)(1),
(2) Date: Jun. 2, 2017

(87) PCT Pub. No.: WO2016/087832
PCT Pub. Date: Jun. 9, 2016

(65) Prior Publication Data
US 2017/0373855 A1    Dec. 28, 2017

(30) Foreign Application Priority Data

Dec. 4, 2014    (GB) .................................. 1421606.3

(51) Int. Cl.
*H04L 29/06*    (2006.01)
*H04L 9/32*    (2006.01)
(Continued)

(52) U.S. Cl.
CPC .......... *H04L 9/3242* (2013.01); *H04L 9/0643* (2013.01); *H04L 29/08* (2013.01);
(Continued)

(58) Field of Classification Search
CPC ....... H04L 9/3242; H04L 4/006; H04L 67/12; H04L 29/08
(Continued)

(56) References Cited

U.S. PATENT DOCUMENTS

2012/0011150 A1 * 1/2012 Swaminathan ..... G06F 16/9535
707/770
2012/0047137 A1   2/2012 Stergiou et al.
(Continued)

FOREIGN PATENT DOCUMENTS

CN    103577198    2/2014
EP    2 131 292    12/2009
(Continued)

OTHER PUBLICATIONS

International Search Report for PCT/GB2015/053653, dated Feb. 23, 2016, 3 pages.
(Continued)

*Primary Examiner* — Evans Desrosiers
(74) *Attorney, Agent, or Firm* — Nixon & Vanderhye P.C.

(57) ABSTRACT

There is provided a method of scanning for a remote device, the method comprising: generating, at a data processing device, a search input; transforming, at the data processing device, the search input to provide a transformed output, wherein the transformed output is representative of the search input; transmitting, a communication comprising the transformed output from the data processing device to the remote device; receiving, at the data processing a device, a communication from the remote device based on the transformed output.

24 Claims, 6 Drawing Sheets

(51) Int. Cl.
  *H04L 29/08*  (2006.01)
  *H04W 4/38*  (2018.01)
  *H04L 9/06*  (2006.01)
  *H04L 12/24*  (2006.01)
(52) U.S. Cl.
  CPC .............. *H04L 41/12* (2013.01); *H04L 67/12* (2013.01); *H04W 4/38* (2018.02)
(58) Field of Classification Search
  USPC ........................................................ 713/168
  See application file for complete search history.

(56) References Cited

U.S. PATENT DOCUMENTS

2012/0179691 A1    7/2012  Cao et al.
2014/0143549 A1*   5/2014  Araki .................... H04L 9/3242
                                              713/175

FOREIGN PATENT DOCUMENTS

EP       2 778 982       9/2017
WO    WO 2011/008889    1/2011

OTHER PUBLICATIONS

Written Opinion of the ISA for PCT/GB2015/053653, dated Feb. 23, 2016, 5 pages.
Search Report for GB1421606.3 dated Jun. 9, 2015, 3 pages.

* cited by examiner

METHOD AND DEVICE FOR SCANNING FOR DATA PROCESSING DEVICES

This application is the U.S. national phase of International Application No. PCT/GB2015/053653 filed 30 Nov. 2015, which designated the U.S. and claims priority to GB Patent Application No. 1421606.3 filed 4 Dec. 2014, the entire contents of each of which are hereby incorporated by reference.

The present technique relates to the field of data processing devices. More particularly, the technique relates to scanning for data processing devices.

More and more data processing devices are being connected to the cloud, for example as part of the "Internet of Things".

Such devices, for example embedded IoT devices, include temperature sensors, healthcare monitors, fitness devices and smart pens, to name but a few, which can be connected to the cloud so that they can be accessed and controlled using remote systems. For example, the IoT devices may generate data which a user wishes to access using a remote device. Alternatively, a user may wish to control an IoT device remotely.

The present technique seeks to improve searching for and identification of data processing devices.

The description provided below and the accompanying figures are intended to illustrate the functions of the present embodiments, and the sequence of steps for constructing and operating the present embodiments. It is not intended to represent the only forms in which the present example may be constructed or utilized. However, the same or equivalent functions and sequences may be accomplished by different examples.

Figure 1:
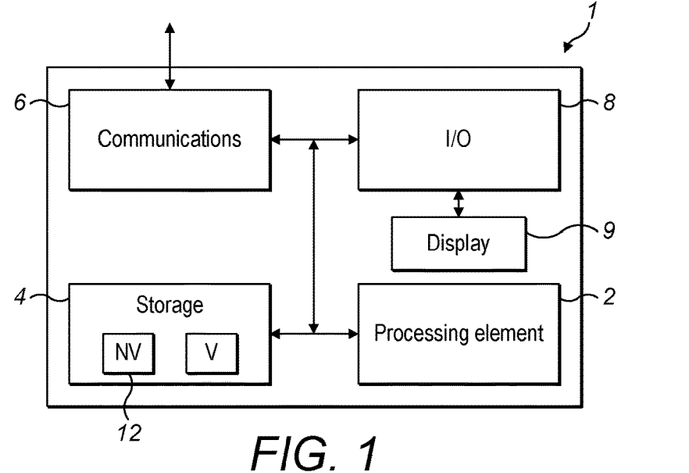
FIG. 1 schematically shows an example of an agent data processing device.

FIG. 1, schematically shows an example of an agent data processing device 1, hereinafter referred to as "agent device" for use with the present techniques.

The circuitry illustrated in FIG. 1 includes processing element 2 coupled to a storage element 4, comprising, for example memory circuitry (volatile memory (V)/non-volatile memory (NV), such as flash and ROM). The memory circuitry 4 may store programs executed by the processing element 2, as well as data such as credentials.

In the present example, the (NV) memory region may be both read and written to, but for which read and write protection may be applied so that the protected (NV) region 12 can only be accessed by privileged software executed by the processing element 2. The protected region 12 may store a secret for encrypting/decrypting messages transmitted/received to/from remote devices. For example, a secret, such as a numerical value/cryptographic key may be stored in the protected region 12, whereby the secret on the agent device 1 may correspond to a secret (e.g. a public/private key pair) held by a data processing device remote therefrom.

The agent device 1 also comprises communication circuitry 6 for communicating with other devices such as data processing devices remote therefrom (not shown in FIG. 1). The communication circuitry 6 may use a wireless communication, such as, for example, wireless local area network (e.g. WiFi), short range communication such as radio frequency communication (RFID), near field communication (NFC), communications used in wireless sensor networks such as ZigBee, Bluetooth and/or Bluetooth Low energy (BLE). Also the communication circuitry 6 may use a cellular network such as 3G or 4G. The communication circuitry 6 may also use wired communication such a fibre optic or metal cable. The communication circuitry 6 could also use two or more different forms of communication, such as several of the examples given above in combination.

The agent device 1 may also comprise input/output (I/O) circuitry 8 such as sensing circuitry to sense inputs from the surrounding environment and/or to provide an output to a user e.g. using a buzzer or light emitting diode(s) (not shown). The agent device 1 may generate operational data based on the sensed inputs, whereby the operational data may be stored in memory circuitry 4. The I/O circuitry 8 may also comprise a user interface (e.g. buttons) to allow the user to interact with the agent device 1. Furthermore, the agent device 1 may comprise a display 9 e.g. an organic light emitting diode (OLED) display, for communicating messages to the user. The display may also be a touch screen to receive inputs from the user.

Although, the agent device 1 may comprise large scale data processing devices such as a tablet computer or mobile telephone, often the agent device 1 comprises a relatively small scale data processing device which is wearable by a user, for example a smart watch.

It will be appreciated that the agent device 1 may comprise other hardware/software components not described herein depending on the specific function of the agent device 1. For example, in the case of a smart-watch, the agent device 1 may comprise a global positioning system (GPS) to capture and record movement of a user and to generate operational data accordingly.

Figure 2:
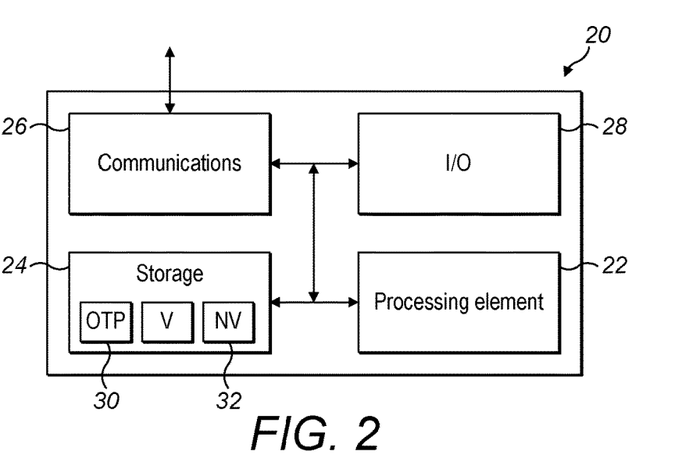
FIG. 2 schematically shows an example of an IoT data processing device which can be searched for by the agent device of FIG. 1.

FIG. 2 schematically shows an example of a data processing device 20 which can be searched for by an agent device using the present techniques. The data processing device 20 is hereinafter referred to as "IoT device."

The IoT device 20 comprises a processing element 22. The processing element 22 in the IoT device 20 may have less processing resources than the processing element 2 in the agent device 1. For example, the processing element 22 may have a more limited set of functions and may be a slower processing element than the processing element 2.

The IoT device 20 further comprises a storage element 24, comprising, for example memory circuitry 24 (volatile memory (V) and/or non-volatile memory (NV), such as flash and ROM).

The memory circuitry 24 may store programs executed by the processing element 22, as well as data such as credentials.

In the present example, the memory circuitry 24 further comprises at least one device identifier, such as a unique device identifier which uniquely identifies the IoT device 20. In the present example, the unique device identifier is stored in a one-time programmable region (OTP) 30, which is a read-only region of memory.

The memory circuitry 24 may also comprise further device identifiers which correspond to attributes associated with the device. For example, device type identifiers may provide further information about the type of device which the IoT device 20 is, and device capability identifiers may provide information relating to device functionality of the IoT device. In the present example, the device identifiers are also stored in the OTP 30.

For example, in the case of a smart-lightbulb, the device type identifiers may include a device manufacturer identifier (e.g. "CompanyX"), an owner identifier (e.g. "CompanyY"), a device class identifier (e.g. "lightbulb") and/or a device location identifier (e.g. "CompanyY_HQ").

The device type identifiers may form a hierarchical chain, for example, device location identifiers may be provided as a hierarchical chain, for example:
"CompanyY_HQ"—(e.g. whereby the device may be located at the headquarter (HQ) site of Company Y)
"CompanyY_HQ\Main_Building"—(e.g. whereby the device may be located within the main building at the HQ site of Company Y)
"CompanyY_HQ\Main_Building\second_floor"—(e.g. whereby the device may be located on the $2^{nd}$ floor of the main building at the HQ site of Company Y.

Furthermore, in the case of a smart-lightbulb, the capability identifiers may include the functionality or functionalities which the device can provide, for example:
"on/off"; —whereby a user may turn the lightbulb on and off
"on/off/dimming"; —whereby a user may control the output of the device
"red only"; whereby the lightbulb emits only red light
"blue only"; whereby the lightbulb emits only blue light
"green only"; whereby the lightbulb emits only green light
"white"; whereby the lightbulb emits white light The device identifiers may be provided within the OTP 30 and may be embedded therewithin during the manufacture, or on installation, of the IoT device 20. In the present example, once fixed in the OTP region 30, the device identifiers cannot be changed. For example, after writing the device identifiers to the OTP region 30, fuses may be burnt through in the memory circuitry 24 so that the OTP region 30 cannot be rewritten.

Alternatively, in some embodiments the device identifiers may be stored in a writeable part of memory, whereby it may be possible to provide new device identifiers for the IoT device 20 post-manufacture. For example, it may be possible to assign a new location identifier on the device if the physical location of the IoT device 20 changes. Alternatively, it may be possible to add a new capability identifier if, for example, the colour of an LED in a smart-lightbulb is changed.

In the present example, the memory circuitry 24 also comprises a non-volatile memory region 32 which can be both read and written to, but for which read and write protection may be applied so that the region 32 can only be accessed by privileged software executed by the processing element 22. The protected region 32 may store a secret for encrypting/decrypting messages transmitted/received from remote devices, for example from the agent device 1 e.g. to verify that the agent device 1 is authorised to communicate therewith. For example, a secret, such as a numerical value (e.g. a shared cryptographic key) may be stored in the protected region 32, whereby the secret on the IoT device 20 may correspond to a secret held by the agent device 1 (e.g. the same cryptographic key).

The IoT device 20 also comprises communications circuitry 26 for communicating with remote data processing devices, such as agent device 1, for example, to receive requests therefrom.

The IoT device 20 further comprises I/O circuitry 28, such as sensing circuitry to sense inputs from the surrounding environment and/or to provide an output to control an operation of the device e.g. to control a transistor to determine the operation of a buzzer, a light emitting diode(s) or a relay (not shown).

Whilst, in the example above, the IoT device 20 is described as a smart-lightbulb, whereby a user may control the emission of an LED, or an array of LEDs on the IoT device 20 from a remote device, the IoT device 20 is not limited to being a smart-lightbulb, and may be any suitable device.

For example, the IoT device 20, may be an embedded device such as a healthcare monitor, which generates operational data related to a user's health such as heart rate, blood sugar level and/or temperature.

Alternatively, the IoT device 20 may be an embedded temperature sensor, which generates operational data based on the temperature of the surrounding environment.

Alternatively, the IoT device 20 may be a smart-door, which is operable to be locked/unlocked based on communications received from a user.

Alternatively, the IoT device 20 may be a wearable device, for example a smart-watch comprising a fitness band which generates operational data relating to movement of a user, for example capturing distance walked/run/swam by a user, or elevation ascended/descended by a user.

Alternatively, the IoT device 20 may be a smart-pen, configured to generate operational data relating to the movement of the pen by the user, for example alphanumeric characters or pictures. The IoT device 1 may also be configured to create files such as JPEG/Vector (e.g. SVG)/Portable Document Format (PDF) recording the specific movements.

It will be appreciated that IoT devices listed above are by way of example only. It will further be appreciated that IoT devices may comprise other hardware/software components not described herein depending on the specific function of the IoT device.

Figure 3:
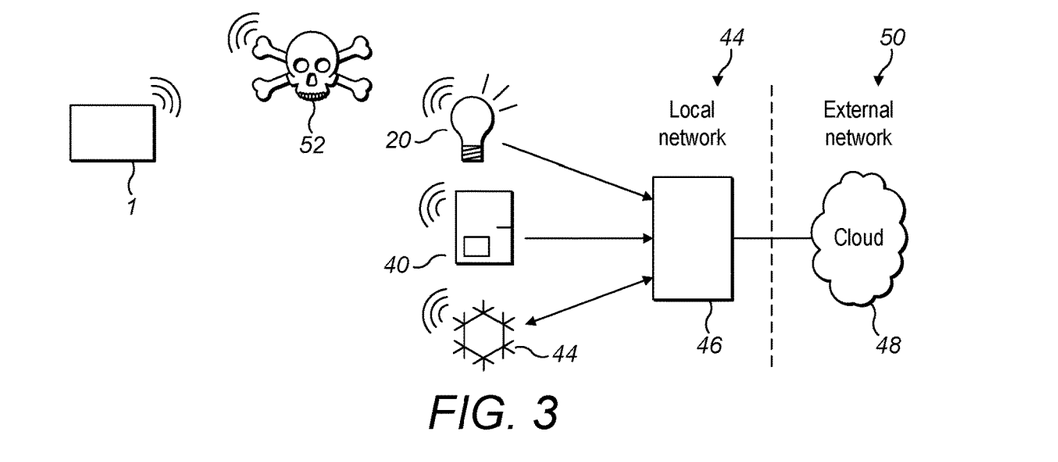
FIG. 3 schematically shows an example of a plurality of data processing devices in a network.

FIG. 3 shows an example of an agent device 1 broadcasting a communication to search/identify/scan for IoT devices remote therefrom. In the present example, IoT devices 20, 40 and 42 are part of a local network 44, which may, for example, be a mesh network.

In the present example, each of the IoT devices 20, 40 and 42 are connected to a cloud service 48 on an external network 50 (e.g. the internet) via a router 46 (e.g. an ISP router).

In the present example, IoT device 20 is depicted as a smart-lightbulb, the IoT device 40 is depicted as a smart-door, and the IoT device 44 is depicted as an air-conditioning control unit 44. However, any suitable data processing devices may be used.

The agent device 1 may remotely control the functionality of each of the IoT devices 20, 40, 42. As an illustrative example, the agent device may issue commands to turn the smart-lightbulb 20 on and off, to lock/unlock the smart-door 40 and to change the temperature of a room using the air-conditioning control unit 44. Such commands may be communicated to the IoT devices 20, 40, 42 via the cloud service 48, e.g. by connecting to the cloud service 48 via ISP router e.g. via WiFi, or via the IoT devices 20, 40, 42 themselves, for example, after pairing the agent device 1 with the IoT devices via BLE, ZigBee etc.

In order for a user in possession of an agent device 1 to identify if an IoT device or number of IoT devices are within the user's vicinity, the user may broadcast a communication comprising search data relating to attributes of IoT device(s) for which the user wishes to scan for. The IoT device(s) may be of a specific type and/or may have one or more capabilities associated therewith.

For example, if a user wants to identify all blue, smart-lightbulbs, which can be turned on/off, manufactured by a Company X and which are located on a certain floor in a building at a Company Y's HQ, the user may scan for such devices by broadcasting a communication comprising search data corresponding to device identifiers stored on the IoT devices from the agent device 1, whereby the search data may comprise combinations of device type identifiers (e.g. device manufacturer identifier, an owner identifier, a device class identifier, and/or a device location identifier) and/or device capability identifiers.

In the present examples, the device identifiers comprise human readable search strings such as: <"lightbulb" AND "blue" AND "on/off" AND "Company_X" AND "CompanyY_HQ\Main_Building."> However, the device identifiers may take any suitable form e.g. binary values, hexadecimal values, alphanumeric characters etc.

Any IoT device within range of the broadcast and meeting the search criteria defined by the search data (e.g. having device identifiers stored within memory circuitry thereon matching the search data) may respond to the agent device 1 by transmitting a communication confirming that it has the matching device identifiers, and may also transmit information allowing the agent device 1 to pair therewith, e.g. a cryptographic key, whereby the agent device may control the IoT device(s) 20 after pairing.

An IoT device(s) not meeting the search criteria may be configured to not respond or, alternatively, may transmit a communication confirming that it does not have the matching identifiers.

It will be appreciated that, the size of the communications may increase depending on the corresponding size of the search data selected by a user. For example, take a communication comprising search data having the following search strings:

<"lightbulb"> AND
<"Company_X"> AND
<"CompanyY_HQ/Main_Building/"second_floor">

Such a communication will typically be larger in size in comparison to a communication comprising the search string: <"lightbulb"> only. However it will be appreciated that a user broadcasting the less-detailed communication may receive responses from a greater number of IoT devices than the more detailed communication, whereby the increased number of responses may require increased processing by the agent device 1 e.g. to filter the responses or to display all the responses to the user.

Furthermore, as the search strings are broadcast in intuitive, human friendly format, it is possible for third party devices 52 receiving the broadcast to track all searches from agent devices. It may then be possible for such third party devices 52 to transmit a signal suggesting that the third party device 52 has certain identifiers even if it does not.

Furthermore, an attacker may be able to deduce the identity of the agent device 1 and/or may also be able to identify the user who initiated the broadcast by inferring the identity(ies) from the human readable search strings within the broadcast.

In embodiments, instead of transmitting search data comprising search strings in intuitive human friendly form, the search data is transformed, whereby for example, the human readable search string is transformed into an obscured value, for example using a hash function, whereby the transformed data is representative of the search data.

As will be appreciated, a hash function can be used to map data of arbitrary size to data of a fixed size, with differences in input data producing differences in output data. For example, a hash function may be used to transform a string of any length into a fixed-length hash value. Any suitable hash functions may be used, including cryptographic hash functions. Examples of such hash functions include, but are not limited to MD5, SHA-1, SHA-2, SHA256, SHA-512, MAC, HMAC, Murmur Hash, Fowler-Noll-Vo (FNV) and/or Jenkins hashes. The hash functions may be one-way hash functions.

Figure 4:
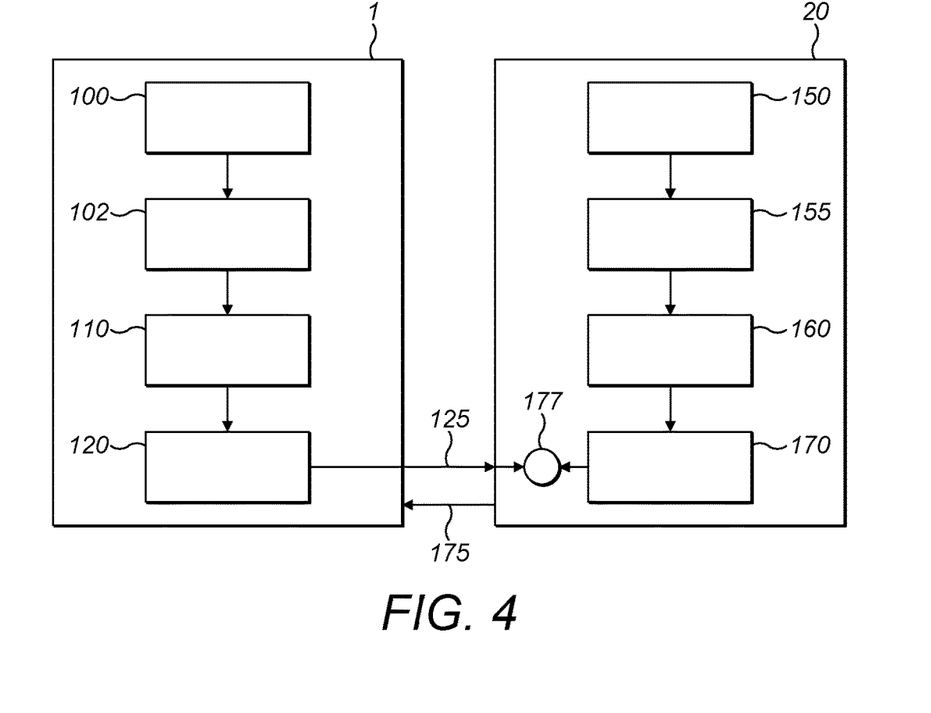
FIG. 4 schematically shows an example of an agent device in communication with an IoT device according to an embodiment.

FIG. 4 shows an example of generating transformed search data 120 for broadcasting from agent device 1 to a remote data processing device 20 according to an embodiment.

A user in possession of the agent device 1 selects a set of search data 100 for which the user wants to scan. In the present example, the user selects search data 100 corresponding to device identifiers of IoT device(s) for which the user wishes to search.

Such search data corresponding to the device identifiers of IoT devices may be stored in memory on the agent device 1 and presented to the user as available search options for selection on a display on the agent device 1 e.g. via an application running on the device.

Additionally or alternatively, the user may define the search data 100 on a display on the agent device 1 by inputting the search data 100 e.g. as a text input on a display on the agent device 1.

Additionally or alternatively, the agent device 1 may receive an input from the user (e.g. via a button input), whereby the agent device 1 automatically generates the search data on receiving the input, whereby the button input corresponds to predefined search data 100 stored on the agent device.

Such functionality is particularly useful where the agent device 1 does not comprise a display to present search data to a user, or whereby the agent device 1 is configured to search for a limited number of devices (e.g. 1 device per input received), or has limited processing capabilities.

The user may also define the length of time for which the agent device should broadcast the scan, and the frequency of the broadcasts. For example, the agent device may be configured to broadcast every n seconds/minutes/hour for a user defined period (e.g. an hour/24 hours etc.), or until the user instructs the agent device to stop scanning.

The methods described above for selecting the search data are illustrative examples only and are not to be taken as an exhaustive list of methods for selecting search data.

The search data 100 may comprise one or more discrete device identifiers. Additionally or alternatively, the search data 100 may comprise combinations of such device identifiers. For example a user may undertake combinations using any suitable Boolean operators including AND, OR, XOR, NOR etc., whereby the search data 100 comprises multiplexed device identifiers. Using such functionality the search data 100 may comprise complex combinations e.g. (("Device identifier A AND Device Identifier B") OR ("Device Identifier A AND Device identifier C"))

In the present example, the user searches for lightbulbs within Company Y's main building, and initiates a search using data corresponding to the device identifiers <"lightbulb" AND "CompanyY_HQ\Main_Building"> as the set of search data 100.

Before broadcasting the communication comprising the search data 100, the agent device 1 provides the search data 100 as a search input 102 to a transform component 110, which in the present examples is a hash function 110, to provide an output 120 comprising a hash value/digest (f(AgOut)) representative of the search input 102. Therefore, it will be appreciated that the hash value/digest is also representative of the search data 100 comprising, for example, the device capability identifiers and/or device type identifiers taken alone or in combination.

It is preferable to use a hash function which provides different hash values for different search inputs, regardless of the differences in the search input. Therefore, as an illustrative example, a search input comprising the device identifier <"lightbulb"> will result in a hash value which is different from a search input comprising the device identifier <"door">, whilst a search input comprising the device identifiers <"lightbulb" AND "blue"> will provide a further different hash value. It will be appreciated that whilst collisions may occur, whereby different search inputs may produce the same hash value, such collisions should be minimised by selecting a suitable hash function.

The output 120 may then be broadcast 125 from the agent device 1 (e.g. using BLE). In the present example, f(AgOut) is "37," which is an example hash value of a Boolean combination of device identifiers i.e. <"lightbulb" AND "CompanyY_HQ\Main_Building">. Additionally, the output may comprise the hash values "23" and "27", which in the present example are the hash values of discrete device identifiers "lightbulb" & "CompanyY_HQ\Main_Building" respectively.

As a further example, a set of search data comprising the combination of device identifiers <"lightbulb" AND "CompanyY_HQ\Main_Building\second_Floor"> provides a hash value of "13."

As such, it will be appreciated that the output 120 comprising the hash values may be reduced in size in comparison to the search input comprising the search data defined by a user, which may benefit the bandwidth of the IoT device in comparison to broadcasting non-transformed search data.

On receiving the broadcast 125, IoT device 20 may provide IoT device data such as device identifiers 150 stored in memory thereon as an input 155 to a transform component 160, which in the present example is a hash function 160, to provide an output 170 comprising a hash value/digest (f(DevOut)) representative of the input 155. In the present examples, the hash functions 110 and 160 provide identical outputs for identical inputs.

It will also be appreciated that the device identifiers 150 stored on the IoT device 20 may be hashed, both individually and in combination to cover all potential combinations of device identifiers which a user may search for. Table 1 below shows illustrative examples of the different hash values for the device identifiers from the IoT device 20 both alone and possible combinations thereof, although not all possible device identifiers or combinations thereof are shown.

TABLE 1

| Examples of Device Identifiers on IoT device | Example Hash Values using a hash function |
| --- | --- |
| "lightbulb" | 23 |
| "CompanyY" | 19 |
| "CompanyY_HQ\Main_Building" | 27 |
| "CompanyY_HQ\Main_Building\First_Floor" | 10 |
| "lightbulb" AND "CompanyY_HQ\Main_Building" | 37 |
| "lightbulb" AND "CompanyY_HQ\Main_Building\First_Floor" | 22 |

The IoT device 20 may then compare f(AgOut) with f(DevOut). Such a comparison may be undertaken using any suitable hardware or software component, which is depicted as comparator 177 in the present examples. Therefore, the output 170 may be taken to comprise "query data", which may be used to verify/check if data falls within search criteria defined by the search input 102 e.g. by being used in a comparison of transformed data or a query of a data structure (as described below).

In the present example, the IoT device 20 generates a hash value of "37" for a combination of its device identifiers, and so f(AgOut)=f(DevOut) i.e. a match.

In some embodiments, the agent device 1 may optionally encode the output 120 before broadcasting the output to the IoT devices, whereby the output 120 may be signed by the agent device 1 using a secret shared with the IoT device 20 (e.g a cryptographic key), whereby the received output 120 may be decoded by the IoT device 20 on receiving the broadcast 125, e.g. by verifying the signature using the shared secret e.g. to check if the agent device 1 is authorised to interact therewith.

The secret used to encode the output 120, may define the privileges to be accorded to the agent device 1 by the IoT devices 20 decoding the output 120.

For example, the IoT device 20 may be required to verify the signature of the output in the received broadcast before undertaking the comparison of f(AgOut) with f(DevOut), whereby, for example, if the IoT device 20 does not verify the signature of the output 120, then the IoT device 20 may not undertake the comparison.

The IoT device 20 may transmit a response 175 to the agent device 1, to confirm a match. The response 175 may, for example, comprise a signal 175 recognisable to the agent device 1 as an acknowledgment that the IoT device 20 comprises a hash value matching that of the broadcast 125. Such a signal 175 may, for example, comprise a nonce or a ping.

Furthermore, in some examples, the IoT device 20 may optionally sign the signal 175, e.g. using a cryptographic key stored within the memory circuitry on the IoT device 20, such that the agent device 1 can verify the identity of the IoT device 20. For example, the IoT device 20 may sign the signal with a private key whereby the signature can be verified using a corresponding public key on the agent device 1.

If there is no match i.e. f(AgOut)≠f(DevOut), the IoT device 20 may not respond to the broadcast 125.

For example, if the user had selected <"lightbulb" AND "CompanyY_HQ\Main_Building\second_Floor"> as the set of search data 100, which in the present example provides a hash value of "13", the IoT device 20 of the present example would not generate a hash value equal to "13", as any combination of device identifiers thereon would not produce such a hash value.

In some embodiments, the hash values representative of the device identifiers of the IoT device 20 may be pre-computed and stored in memory thereon, e.g. within a hash table, such that when the broadcast 125 is received from agent device 1, the IoT device 20 may check if the received hash values f(AgOut) match any of the pre-computed values.

Such pre-computation may be undertaken on a separate data processing device (e.g. a computer terminal) and uploaded to the memory on the IoT device 20 e.g. at manufacture. Alternatively, such pre-computation may be undertaken on the IoT device 20 itself e.g. when first initialised, or if a device identifier is modified.

It will be appreciated that pre-computing hash values may reduce the amount of processing required to be undertaken by an IoT device, e.g. referring to values stored in memory circuitry may require less processing capabilities in comparison to computing values every time a broadcast is received.

It will be appreciated that the decimal hash values used in the present example are provided as illustrative examples only, and f(AgOut) may be a 128-bit, 256-bit, 512-bit value or any suitable value as required by a user.

Figure 5:
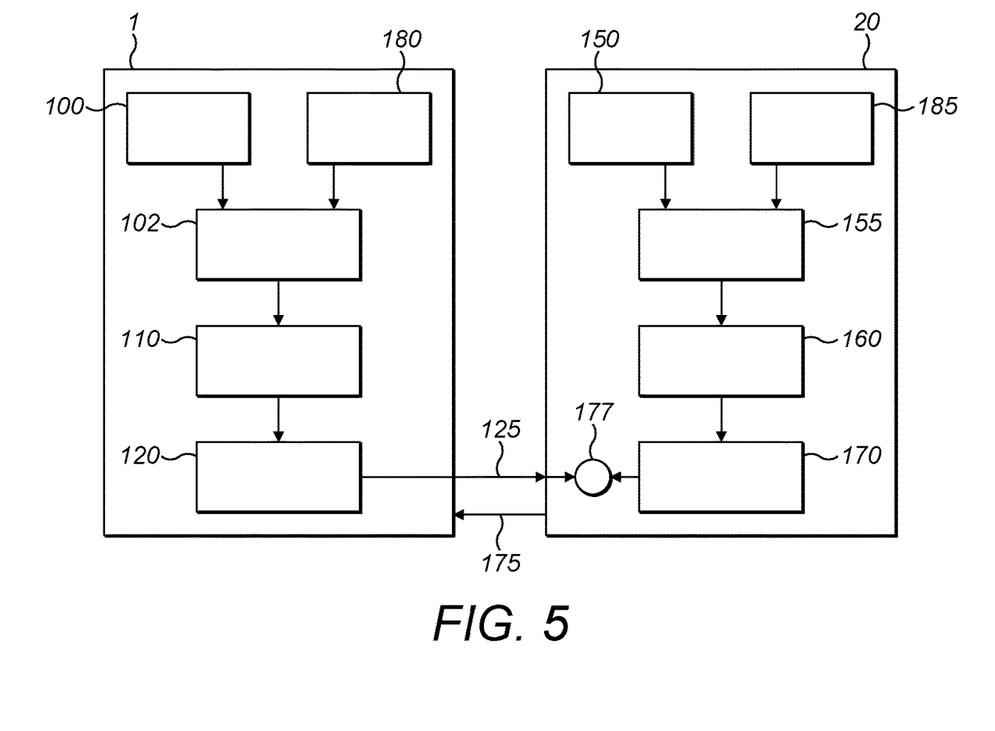
FIG. 5 schematically shows a further example of the agent device in communication with the IoT device.

FIG. 5 shows an example of generating transformed search data 120 for broadcasting from agent device 1 using a dynamically changing search input 102 to scan for IoT devices according to an embodiment.

As before a user selects the set of search data 100 for which the user wants to scan (e.g. comprising discrete device identifiers and/or combinations thereof). In the present example, the agent device 1 further comprises a constantly varying value generator 180. In the following embodiments, the varying value generator 180 comprises a UNIX time unit 180, whereby the value generated by the UNIX time unit 180 is a UNIX time value. In alternative embodiments, the varying value generator 180 may comprise a pseudo-random number generator which, for example, generates a varying nonce value, e.g. a 128/256/512-bit nonce value.

The UNIX time value is combined with the search data 100, e.g. whereby the search data may be modified using the UNIX time value, to form a search input 102.

The agent device 1 then transforms the search input 102 using the hash function 110 to provide output 120 comprising hash value/digest f(AgOut). It will be appreciated that as the value generated by the UNIX time unit 180 varies over time, f(AgOut) will also vary over time.

It will be appreciated that the hash value/digest f(AgOut) is also representative of the search data 100 comprising, for example, the device capability identifiers and/or device type identifiers taken alone or in combination, and the value generated by the UNIX time unit. For example, if the UNIX time unit is configured to generate a value every second/minute/hour, the value f(AgOut) will also vary accordingly.

The output 120 may then be broadcast 125 from the agent device 1 after each variation in value of f(AgOut).

In the present example, the IoT device 20 comprises IoT device data such as device identifiers 150 stored in memory and a constantly varying value generator 185. In the following embodiments, the varying value generator 185 comprises a UNIX time unit 185, whereby the value generated by the UNIX time unit 185 is a UNIX time value. In alternative embodiments, the varying value generator 185 may comprise a pseudo-random number generator which, for example, generates a nonce.

As before, on receiving the broadcast, IoT device 20 may combine the device identifiers with the UNIX time value from UNIX time unit 185, e.g. whereby the device identifiers are modified using the UNIX time value, to provide input 155, whereby the input 155 is used as an input to the hash function 160 to provide an output 170 comprising a hash value/digest (f(DevOut)).

The IoT device 20 may then compare f(AgOut) with f(DevOut), and, if the hash values match for a particular time i.e. if f(AgOut)=f(DevOut), then the IoT device 20 may transmit a signal 175 to the agent device 1, to confirm a match.

As before, it will be appreciated that the hash functions 110 and 160 may be the same, whilst the varying value generators 180 and 185 may be substantially synchronised. In some embodiments, the IoT device 20 may generate f(DevOut) for different values of the varying value generators to accommodate for variations/drift in the synchronisation between the varying value generators 180 and 185. Additionally or alternatively, f(AgOut) may be generated for different values of the varying value generators.

For example, for a UNIX time unit, f(DevOut) may be calculated for + and/or −n seconds (e.g. a window to accommodate for diverging UNIX time units 180/185). It will be appreciated that in alternative examples f(DevOut) may be calculated for minutes, hours, etc. depending on the requirements of the user.

As before, the agent device 1 may optionally encode the output 120 before broadcasting the output to the IoT devices, whereby the output 120 may be signed by the agent device 1 using a secret shared with the IoT device 20 (e.g. a cryptographic key), whereby the received output 120 may be decoded by the IoT device 20 on receiving the broadcast 125, e.g. by verifying the signature using the shared secret e.g. to check if the agent device 1 is authorised to interact therewith.

Figure 6:
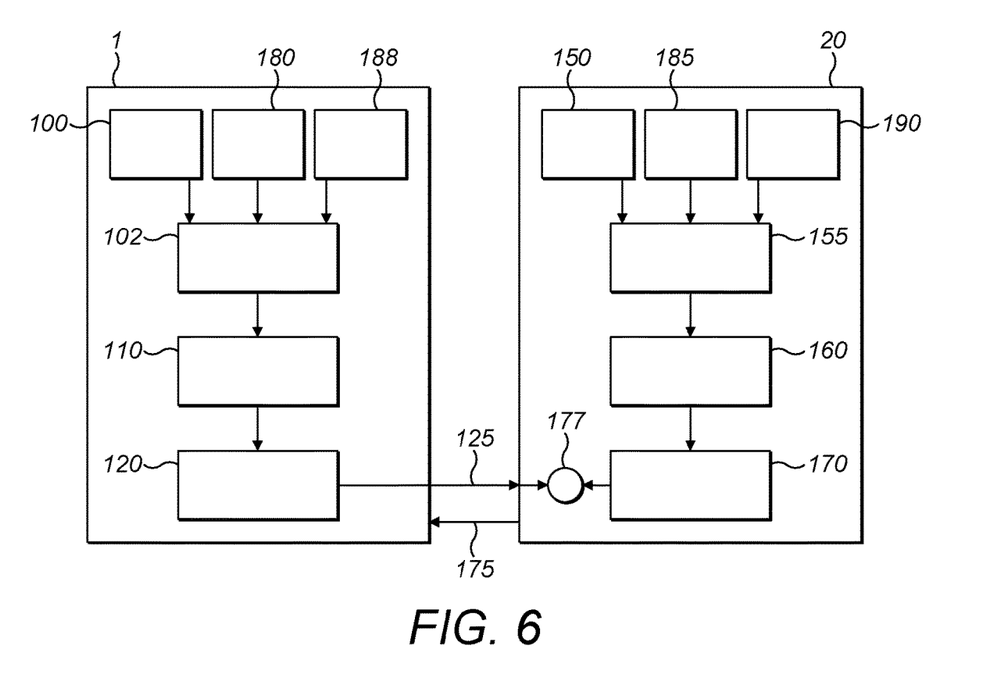
FIG. 6 schematically shows a further example of the agent device in communication with the IoT device.

FIG. 6 shows an example of generating transformed search data 120 for broadcasting from agent device 1 using an input comprising secret data 188 to scan for IoT devices according to an embodiment.

As before a user selects the set of search data 100 for which the user wants to scan (e.g. comprising discrete device identifiers and/or combinations thereof). In the present example, the agent device 1 comprises, a varying value generator, which in the present example is a UNIX time unit 180 and further comprises secret data 188. The secret data 188 may be a key such as a numerical value e.g. a 128/256/512-bit value.

In the present example, the search data 100 is combined with the UNIX time value from UNIX time unit 180 and secret data 188, e.g. whereby the search data is modified using the UNIX time value and secret data 188, to form search input 102.

The agent device 1 then transforms the search input 102 using the hash function 110 to provide output 120 comprising hash value f(AgOut).

It will be appreciated that the hash value f(AgOut) is representative of the search input 102, which comprises the search data 100 comprising, for example, the device capability identifiers and/or device type identifiers taken alone or in combination combined with, e.g. modified using the value generated by the UNIX time unit and/or the secret data.

The output 120 comprising f(AgOut) may then be broadcast 125 from the agent device 1.

In the present example, the IoT device 20 comprises IoT device data such as device identifiers 150 stored in memory, UNIX time unit 185 and secret data 190.

As before, on receiving the broadcast, IoT device 20 may combine the device identifiers 150 and/or combinations thereof with the UNIX time value 185 and secret data 190 and provide the combination as an input 155 to the hash function 160 to provide an output 170 comprising a hash value/digest (f(DevOut)) representative of the input 155.

The IoT device 20 may then compare f(AgOut) with f(DevOut), and, if the hash values match i.e. if f(AgOut)=f (DevOut), then the IoT device 20 may transmit a signal 175 to the agent device 1, to confirm a match.

When responding to the broadcast, the IoT device 20 may optionally encode the signal 175 with a secret e.g. the secret data 190, such that when the signal 175 is received by the agent device 1 it can verify that the signal 175 was generated by an authorised IoT device 20 (e.g. a device having the secret data 190).

Additionally or alternatively, the IoT device 20 may sign the signal 175, e.g. using a cryptographic key stored within the memory circuitry on the IoT device 20, such that the agent device 1 may verify the identity of the IoT device 20 e.g. using a corresponding cryptographic key.

Using such techniques, even if an IoT device not having the required device identifiers responds to the broadcast 125, the agent device 1 may determine the authorisation status of the IoT device 20 by verifying the encoded signal. If the agent device 1 receives a signal which is not verified, the agent device 1 may conclude that the device which transmitted the signal is not an authorised device and may, for example, issue a warning to a user not to connect to or control that device.

It is possible to provide secret data to the agent device 1 and IoT device 20 using any suitable method. For example, the secret data may be provided from a suitable communications channel e.g. from a public interface such as an open company server over a wireless channel, a QR code on a wall in a building, a text message, via a dongle inserted into each device and/or at manufacture.

It will be appreciated that whilst IoT devices may receive broadcasts comprising f(AgOut) which is representative of the secret data 188, only IoT devices having the corresponding secret data 190 may generate a matching f(DevOut).

Furthermore, in some examples, the secret data 188 may be limited to a specific device identifier (e.g. device class identifier, device capability identifier etc.) for example, if a user selects a device identifier in the search data 100 not covered by the secret data 188/190, then the IoT device 20 will not be capable of generating f(DevOut)=f(AgOut).

As an illustrative example, if an agent device 1 is provided with secret data 188 covering a particular device class, e.g. for example corresponding to device class identifier <"lightbulb">), then a user may use "lightbulb" within the search data 100, whereby the search data 100 is combined with the secret data 188, and provided as the search input 102 to the hash function 110 to provide f(AgOut), which is then broadcast 125.

On receiving the broadcast, IoT devices having device class identifier "lightbulb" and secret data 190, corresponding to secret data 188, will generate a hash value f(DevOut) which matches f(AgOut).

It may be the case that the user may not be limited to search for a particular number of device identifiers, and if, for example, a particular device identifier not covered by the secret data is included in a set of search data then the IoT device receiving the broadcast may respond if some search data covered by the secret data is included in the search.

In an illustrative example, if secret data 188/190 was provided to cover the device class identifiers <"lightbulb">, IoT devices 20 having a device class identifier <"lightbulb"> and the secret data would generate a match in response to a broadcast having the device class identifier and secret data even if other search data were included. For example, if a user searched for devices having the device identifiers <"lightbulb"> OR <"Door">, then IoT lightbulbs may generate a match in such a case.

The secret data 190 may be updated on the IoT devices periodically, e.g. every hour, daily, monthly, such that users having an agent device 1 provided with secret data 188 may search for particular IoT devices 20 for a defined period of time.

It will be appreciated that the IoT devices 20 may comprise secret data 190 corresponding to secret data 188 which differs across multiple agent devices 1. Such functionality may define different privileges, e.g. restricted searches, limited access, for different agent devices (e.g. whereby the different agent devices may be owned by different parties).

In an illustrative example, an agent device belonging to a guest e.g. an IoT lightbulb engineer may be provided with secret data 188 (e.g. Secret1) which allows the guest to search for all IoT lightbulbs within a particular building (e.g. whereby Secret1 covers device class <"lightbulb"> only).

In the present example, the IoT lightbulbs within the building comprise the device class identifier "lightbulb" and are also provided with the corresponding secret data 190 (e.g. Secret2) covering the device class identifier <"lightbulb">. Therefore, the guest can scan for lightbulbs by broadcasting a search for all lightbulbs using search data 100 <"lightbulb"> as part of the search input 102 along with the secret data 188 (Secret1) (e.g. whereby the search data 100 is combined with the secret data 188) and receive responses from all IoT lightbulbs having the device identifier <"lightbulb"> and the corresponding secret data 190 (Secret2) stored in memory thereon.

As a further example, an agent device belonging to a fully authorised party e.g. a site maintenance engineer or an owner of the infrastructure may be provided with secret data 188 (Secret3) covering all possible combinations of device identifiers which allows the fully authorised party to scan for all IoT devices within the building.

In the present example, all IoT devices are also provided with corresponding secret data (secret4). Therefore the fully authorised party can broadcast a search for all, or specific IoT devices in the building and receive responses from all IoT devices having the corresponding device identifiers and secret data 190 (Secret4).

In some examples, as before, the agent device 1 may encode the output 120 before broadcasting the output to the IoT devices, whereby the output 120 may be signed by the agent device 1 using a secret shared with the IoT device 20 (e.g. secret data 188/190 or a cryptographic key), whereby the received output 120 may be decoded by the IoT device 20 on receiving the broadcast 125, e.g. by verifying the signature using the shared secret e.g. to check if the agent device 1 is authorised to interact therewith.

Such functionality may reduce the likelihood of malicious scanning by rogue devices or of a denial of service (DoS) attack e.g. from a plurality of rogue devices.

In some examples, the signature used to sign the output 120 may be time dependant, whereby, for example, the time dependent signature is derived from, for example, the shared secret and the time varying value generated at the agent device 1.

The IoT device 20 may verify the time dependant signature using the corresponding time varying value generated thereon and the corresponding shared secret e.g. whereby the IoT device may verify the signature across multiple time windows to account for divergence.

Alternatively, the time varying value used in the signature may be broadcast along with the output 120, whereby the IoT device 20 could use the time varying value received in the broadcast along with the corresponding shared secret to verify the signature. Using such functionality, IoT devices would not have to verify signatures across multiple time windows.

Figure 7:
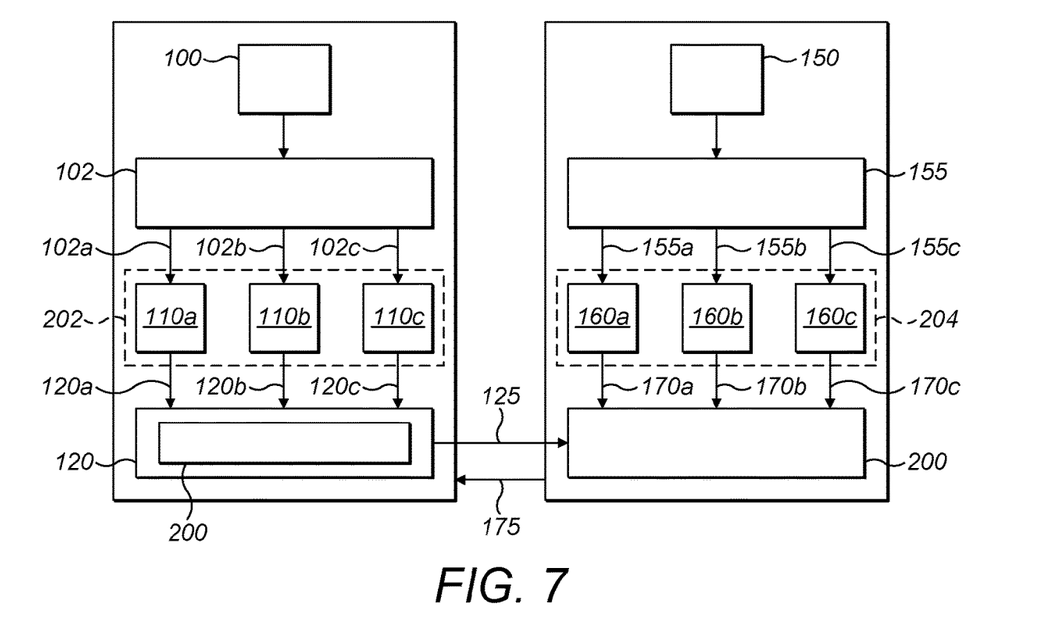
FIG. 7 schematically shows a further example of the agent device in communication with the IoT device.

Whilst the examples above describe generating an output using a single hash function, any number k hash functions may be used to generate the output. FIG. 7 shows an example of agent device 1 comprising k=3 hash functions.

In the present example, the agent device 1 uses the search input 102, comprising, for example search data 100 having device type identifiers and/or device capability identifiers (either alone or in combination) as separate search inputs 102a, 102b and 102c to the k hash functions 110a 110b 110c (shown collectively as 202 in FIGS. 7, 8a, 9 & 11), to provide outputs 120a, 120b and 120c comprising hash values/digests (f(AgOut)a, f(AgOut)b and f(AgOut)c) of the respective search inputs 102a, 102b and 102c. As before, the hash values/digests of the different hash functions 110a, 110b, 110c are representative of the search inputs 102a, 102b, 102c.

Whilst in some examples, the outputs 120a, 120b, 120c may be broadcast 125 from the agent device 1 (e.g. using BLE), the outputs 120a, 120b and 120c may alternatively be used as inputs to various hardware/software components on the agent device and/or IoT devices. For example, the hash values may be used to set the values of bits of a Bloom filter (as described below).

On receiving the broadcast 125, IoT device 20 may provide input 155 (e.g. comprising device identifiers 150 as shown in FIG. 7) as separate inputs 155a, 155b and 155c to hash functions 160a, 160b and 160c (shown collectively as 204 in FIGS. 7, 8b, 9 & 10), to provide outputs 170a, 170b and 170c comprising hash values/digests (f(DevOut)a, f(DevOut)b and f(DevOut)c) of the respective inputs 155a, 155b and 155c.

The outputs 170a, 170b and 170c may be used as query data, for example by comparing hash values of the outputs in the received broadcast 125 to confirm a match/no match, or by querying a Bloom Filter in the received broadcast 125 (as described below).

As before, the output 120 may be encoded by the agent device 1 using a secret shared with the IoT device 20, such that before undertaking a comparison of the hash values or querying the Bloom filter, the IoT device 20 will decode the received output 120 to check if the agent device 1 is authorised to interact therewith.

Figure 8A:
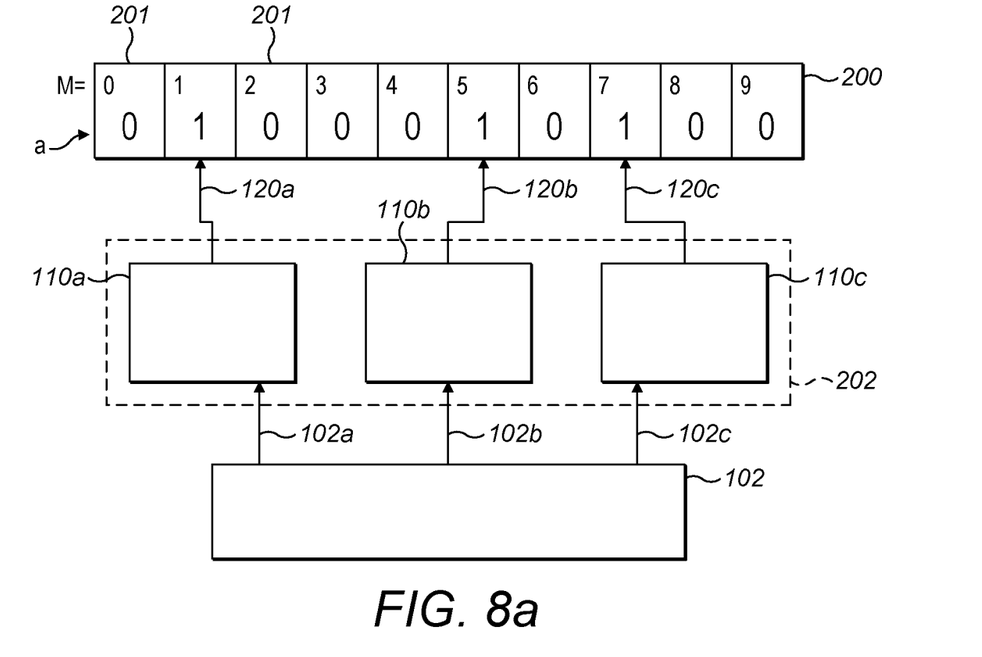
FIG. 8a schematically shows an example of setting a Bloom filter.
Figure 8B:
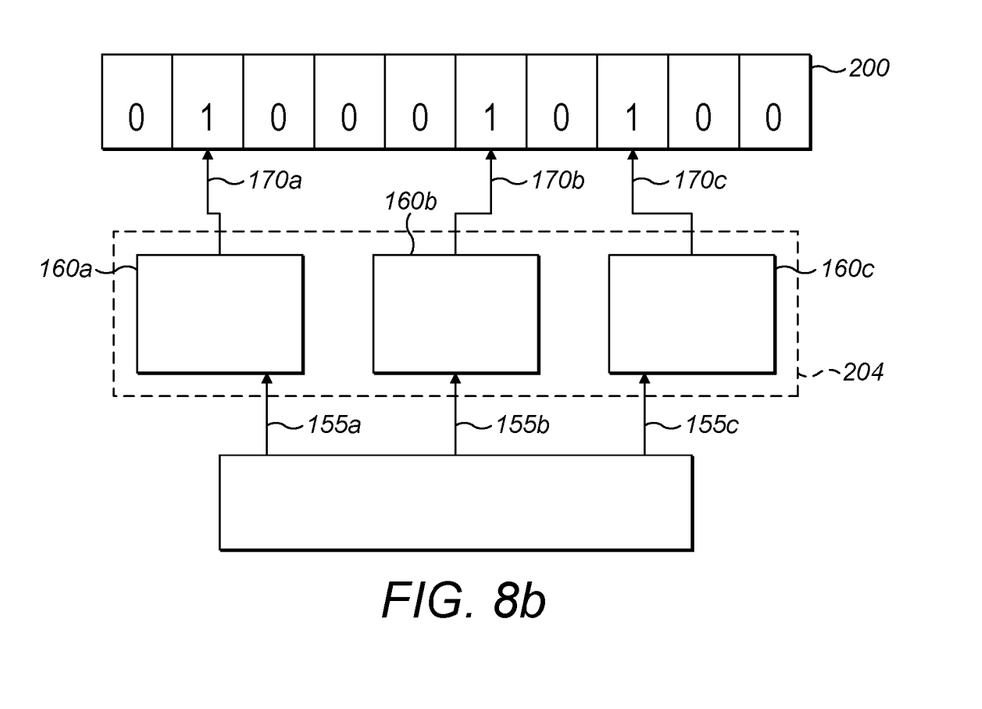
FIG. 8b schematically shows an example of querying the Bloom filter.

FIG. 8a shows a schematic example of setting a Bloom filter 200, whilst FIG. 8b shows an example of querying the Bloom filter 200.

A Bloom filter is a space-efficient probabilistic data structure comprising an array a having m bit positions 201, which is used to test whether certain data is a member of a set of search data. False positive matches are possible, but false negatives are not.

In an empty Bloom filter the bits b at each of the m bit positions 201 may all be set to 0.

In order to set the bits b in the Bloom filter, the search input 102 is passed through the hash functions 202, whereby the respective hash values of the outputs 120a-c (f(AgOut)a, f(AgOut)b), f(AgOut)c) are each taken to correspond to one of the m bit positions in the array a of the Bloom filter.

The bits b of the Bloom filter at each of the corresponding m bit positions in the array a are then set to 1.

For example, in the example in FIG. 8a:
- the hash value of output 120a, f(AgOut)a=1=>set value of bit b at m=1=to 1
- the hash value of output 120b, f(AgOut)b=5=>set value of bit b at m=5=to 1
- the hash value of output 120c, f(AgOut)c=7=>set value of bit b at m=7=to 1

In some circumstances, the hash values of different outputs may correspond to the same bit position in the array a.

As before, the search input 102 may comprise search data 100: comprising for example:
- a device location identifier <"CompanyY_HQ/second_floor">;
- a device class identifier <"lightbulb">; and
- a device capability identifier <"can switch on lights">.

Furthermore the search data may comprise discrete device identifiers and/or combinations thereof. Therefore, it will also be appreciated that the Bloom filter 200 is representative of the search data 100 comprising, for example, the device capability identifiers and/or the device type identifiers taken alone or in combination.

Therefore, it will be appreciated that the set Bloom filter 200 is representative of the search input 102, and that the Bloom filter will be reduced in size in comparison to the search input comprising the non-transformed search data defined by a user, which may benefit the bandwidth of the IoT device when broadcasting the Bloom filter in a scanning operation in comparison to broadcasting non-transformed search data.

Furthermore, a user may provide a plurality of device identifiers as search data to generate corresponding Bloom filters. The corresponding Bloom filters may then undergo a Boolean operation e.g. (an 'AND'/'OR') to provide a data structure comprising the corresponding Bloom filters which is then broadcast. As before the IoT device 20 may comprise pre-computed data which is used to query the data structure comprising the corresponding Bloom filters.

For example, a user wishing to search for lightbulbs at Company Y's main building may select first search data e.g. "lightbulb" which is used as a first search input to generate a first Bloom filter representative of the first search data. The user may then select second search data e.g. <"CompanyY_HQ\Main_Building"> which is used as a second search input to generate a second Bloom filter representative of the second search data.

The first and second Bloom filters may then be used to form a data structure comprising both Bloom filters and transmitted in a broadcast 125 to be queried using data generated/provided on the IoT device 20.

As shown in FIG. 8b, in order to verify if IoT device data matches the search input 102 represented by the Bloom filter, the IoT device data 155 is passed as separate inputs 155a, 155b and 155c through the different hash functions

204, whereby the respective hash values (f(DevOut)a, f(DevOut)b), f(DevOut)c) of the different hash functions 204 are each taken to correspond to one of the m bit positions in the array a of the Bloom filter 200.

If any of the bit values at the corresponding m bit positions are set to 0, the IoT device data does not match the search data. However, if, as shown in the example of FIG. 8b, all of the bit values are set to one, the IoT device data 155 may match the search data 102, although the probability is less than 100%.

Furthermore, whilst the examples shown in FIGS. 8a and 8b depict a Bloom filter having a 10-bit array, a Bloom filter may comprise any suitable number of bits in an array e.g. 128/256/512-bits.

Suitable hash functions for use with Bloom filters include HMAC, MD5, Murmur Hash, Fowler-Noll-Vo (FNV) and/or Jenkins hashes. In some examples, the hash functions may be one-way hash functions.

Whilst FIGS. 8a and 8b depict a Bloom filter having k=3 hash functions, it will be appreciated that any number of hash functions may be used, whereby the number of hash functions may be dependent on the requirements of a user, e.g. processing of the data processing devices, acceptable level of false positives.

In some examples, the hash values required to set a bloom filter 200 may be of limited length. For example, for a 256-bit Bloom filter, hash values of 8-bits in length may be used to set the bit values of the Bloom filter. However, it will be appreciated that cryptographically secure hash values will generally be longer than 8-bits.

Therefore, hash values used to set the corresponding bits of the Bloom filter may be derived from the hash values generated using a single cryptographically secure hash function i.e. k=1, e.g. a 512 bit hash value generated using SHA-512.

For example, bits 0-7 of the 512 bit hash value may be taken to correspond to a first bit position in the Bloom filter array, bits 8-15 may be taken to correspond to a second bit position in the array, bits 15-22 may be taken to correspond to a third bit position.

As such, it will be appreciated that the bit positions for the Bloom filter array may be derived from any number of hash values, including for example from a cryptographic hash value, provided, for example, by a single cryptographic hash function i.e. whereby k=1.

Therefore, the computational load for a device generating a Bloom filter may be reduced by sharing the same underlying cryptographic hash function used to generate the cryptographic hash value.

In a further example, where k=1, a Bloom filter having a size B of m bits is set using the output of a hash function whereby k=1. In the present example the hash function is, for example SHA256, which provides a 256 bit hash value (N). The hash value (N) is then split into blocks of T bits, whereby

T=N/M

The resulting binary value of T is further reduced to a value corresponding to the Bloom filter size B, where B<=T. For example, reducing the binary value of T can be achieved by hashing. Such hashing may be unsecure, for example using an operation such as "T mod B". Using the above described functionality, the requirement for secure multiple hashing is reduced, thereby reducing the computational overhead.

Figure 9:
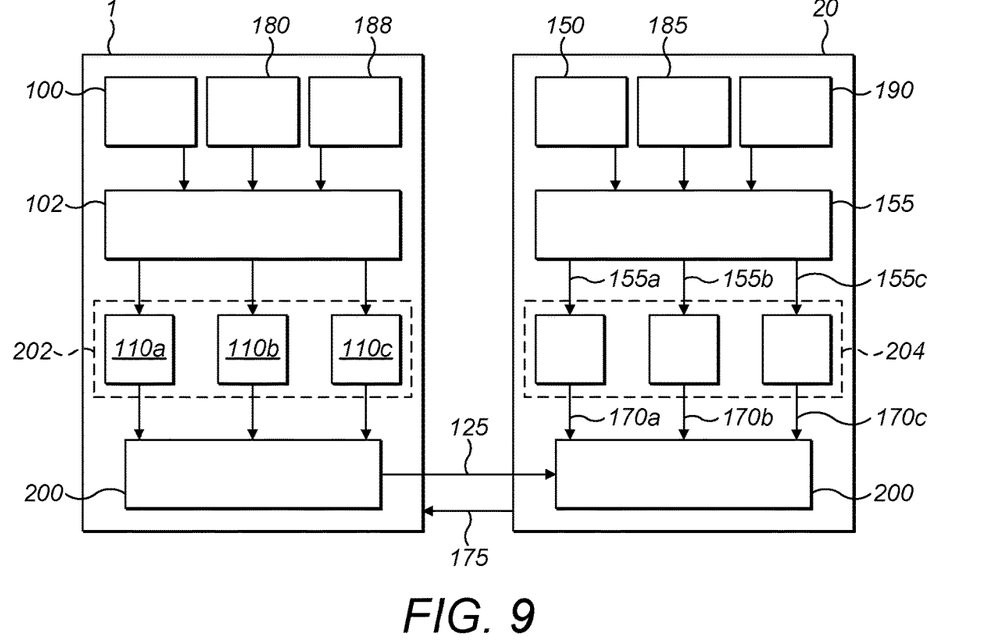
FIG. 9 schematically shows a further example of the agent device in communication with the IoT device.

As before, a user may combine the search data 100 with a varying value 180 and/or secret data 188 to provide search input 102 as shown in FIG. 9.

If the search input 102 comprises a varying time value 180, then the outputs 120a, 120b and 120c from each of the hash functions 110a, 110b, 110c may also vary over time, as will the values of bits b at the corresponding m bit positions of the array a of the Bloom filter 200.

Furthermore, if the input comprises secret data 188, then the outputs 120a, 120b and 120c from each of the hash functions 110a, 110b, 110c will be dependent on the secret data 188, and so the values of bits b in the array a of the Bloom filter 200 will be set dependant on the secret data 188.

On receiving broadcast 125 with the Bloom filter, IoT device 20 may provide device identifiers 150 stored in memory thereon, values of the varying value generator 185 and/or secret data 190 as inputs 155a, 155b and 155c to the different hash functions 204 to provide outputs 170a, 170b and 170c comprising hash values/digests (f(DevOut)a, f(DevOut)b and f(DevOut)c), which correspond to one of the m bit positions in the array a of the received Bloom Filter 200, and so can be used to query the Bloom filter 200 for the device identifiers 150 and the different values of the varying value generator 185 and secret data 190.

If any of the bits in the bit positions of the Bloom filter 200 corresponding to the hash values of outputs 170a, 170b, 170c are set to 0 (zero), the device identifiers 150 are definitely not in the set of search data 100, the output from the Unix time unit 185 is not synchronised with the Unix time unit 180 on the agent device 1, and/or the secret data 190 does not match the secret data 188.

If all the bits corresponding to the bit positions are set to 1, then either the device identifiers 150 of the IoT device 20 are in the set of search data 100, the Unix time units 180 and 185 are synchronised and/or the secret data 188 matches the secret data 189 or the bits have by chance been set to 1 during the insertion of other elements, resulting in a false positive.

As before, the calculated values for the m bit positions for the device identifiers 150 and the different values of the varying value generator 185 and secret data 190 may alternatively be pre-computed and stored in memory on the IoT device 20 such that the IoT device 20 does not have to undertake the calculations for the m bit positions. Instead the IoT device 20 can obtain the hash values from memory (query data), and check the bit values of the corresponding m bit positions on the received Bloom filters 200.

As before, the output 120 may be encoded e.g. signed by the agent device 1 using a secret shared with the IoT device 20, such that before undertaking a comparison of the hash values or querying the Bloom filter, the IoT device 20 will decode e.g. verify the received output 120 to check if the agent device 1 is authorised to interact therewith.

In some examples, the signature used to sign the output 120 may be time dependant, whereby, for example, the time dependent signature is derived from, for example, the shared secret and the time varying value generated at the agent device 1.

The IoT device 20 may verify the time dependant signature using the corresponding time varying value generated thereon and the corresponding shared secret e.g. whereby the IoT device may verify the signature across multiple time windows to account for divergence.

Such functionality may reduce the effects of malicious scanning by rogue devices and reduce the likelihood of denial of service attacks, whereby an IoT device may only query a Bloom filter if the signature of an output in a received broadcast is verified.

Alternatively, the time varying value used in the signature may be broadcast along with the output 120, whereby the IoT device 20 could use the time varying value received in the broadcast along with the corresponding shared secret to verify the signature. Using such functionality, IoT devices would not have to verify signatures across multiple time windows.

Additionally or alternatively, when responding to the broadcast, the IoT device 20 may encode the signal 175 with a secret e.g. a cryptographic key, such that when the signal 175 is received by the agent device 1 it can verify that the signal 175 was generated by an authorised IoT device 20.

Using such techniques, even if IoT devices not having the correct identifiers respond to the broadcast 125 (e.g. due to a false positive), the agent device 1 may identify which IoT devices are authorised by verifying the encoded signal e.g. with the corresponding secret data 188.

If the agent device 1 receives a signal 175 which is not encoded with the expected secret the agent device 1 may conclude that the device which transmitted the signal 175 is not an authorised device and may, for example, issue a warning to a user not to connect to that particular device.

Figure 10A:
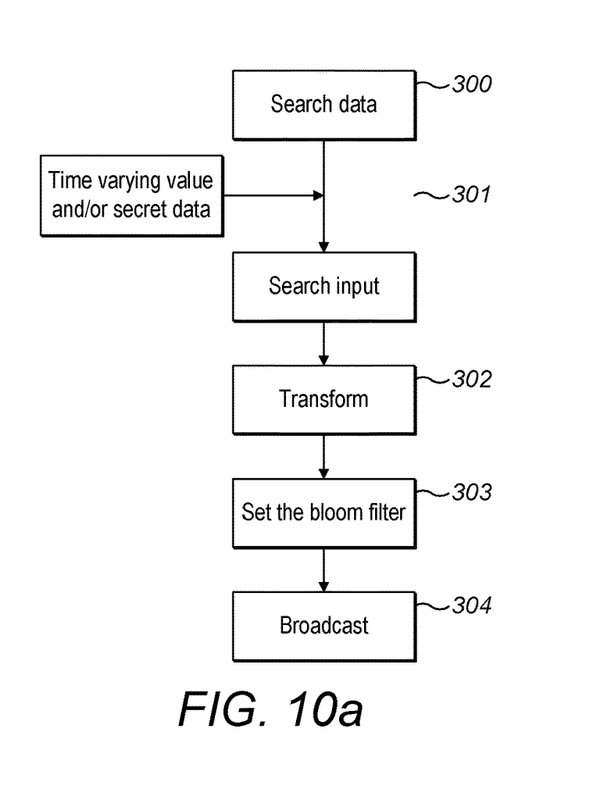
FIG. 10a illustrates an example of a user selecting search data on an agent device for scanning for at least one IoT device using a Bloom filter.
Figure 10B:
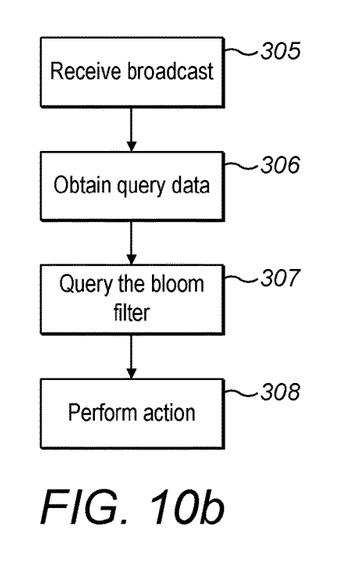
FIG. 10b illustrates an example of an IoT device receiving the broadcast and querying the Bloom filter.

FIG. 10*a* illustrates an example of a user selecting search data on an agent device 1 for scanning for at least one IoT device 20 using a Bloom filter, whilst FIG. 10*b* illustrates an example of at an IoT device receiving the broadcast and querying the Bloom filter.

At step 300, a user having access to an agent device defines search data by selecting attributes of an IoT device for which the user wishes to scan. As before, selection of attributes may comprise inputting known device identifiers of IoT devices into a text input field on the agent device. The selection may comprise selecting one or more discrete device identifiers and/or may comprise selecting a combination of device identifiers e.g. using Boolean operators. Such device identifiers may include device type identifiers, device capability identifiers and/or any suitable identifiers.

At the step 301, the agent device may optionally combine the search data with a time varying value and/or secret data, e.g. by modifying the search data using the time varying value and/or secret data, to provide a search input.

At step 302, the search input is provided to a transform component. In the present example the transform component comprises k hash functions, which provide, as an output, hash values representative of the search input.

At step 303, the hash values are used to set the bit values of the bits b of a Bloom filter. At step 304, the set Bloom filter is broadcast from the agent device e.g. using BLE.

At step 305, an IoT device within range of the broadcast receives the broadcast. At Step 306, the IoT device obtains query data. The query data may be pre-computed on the IoT device and stored in memory circuitry thereon, or the IoT device may generate the query data using data stored/generated thereon e.g. device identifiers/varying values/secret data.

At step 307, the IoT device queries the set Bloom filter received in the broadcast using the query data. If all bits of the Bloom filter corresponding to the query data are set to "1", then the IoT device identifies a match. If any of the bits of the Bloom filter corresponding to the query data are set to "0", then the IoT device does not identify a match.

At step 308, the IoT device performs an action dependent on the whether there is a match or not. For example, if there is a match the IoT device may transmit a signal to the agent device to confirm a match. If there is no match, the IoT device may transmit a signal confirming there is no match, or the IoT device may be configured to not acknowledge the broadcast.

Figure 11:
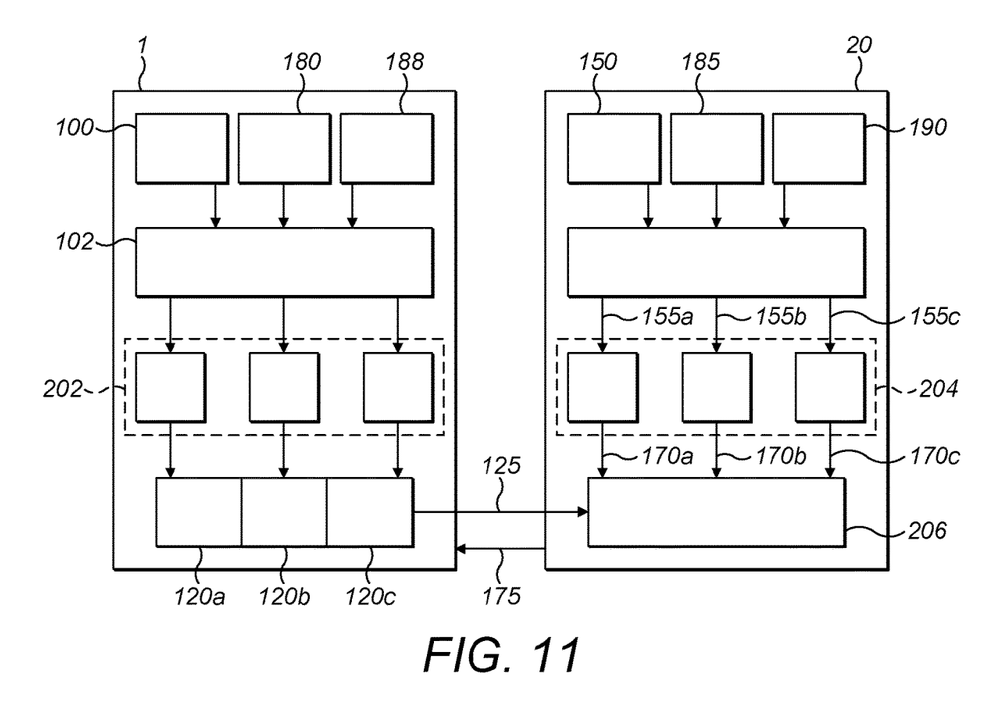
FIG. 11 schematically shows a further example of the agent device in communication with the IoT device.

As shown in FIG. 11, in a further embodiment, instead of generating and broadcasting a Bloom filter, the agent device 1 may broadcast the outputs 120*a*, 120*b* 120*c* comprising the hash values f(AgOut)a, f(AgOut)b, f(AgOut)c from the k hash functions 202. As before, it will be appreciated that the hash values are representative of the search data 100 comprising, for example, the device capability identifiers and/or device type identifiers taken alone or in combination. It will also be appreciated that, when the varying values and/or secret data are included in the search input 102, the hash values will be representative of the search data 110, the varying values 180 and/or secret data 188.

In the present example, the IoT device 20 may provide device identifiers 150, varying values 185 and/or secret data 190 as inputs 155*a*, 155*b* and 155*c* to the different hash functions 204 to provide outputs 170*a*, 170*b* and 170*c* comprising hash values/digests (f(DevOut)a, f(DevOut)b and f(DevOut)c).

The IoT device 20 further comprises a Bloom filter 206, whereby the bit values of the Bloom filter are set using the hash values (f(DevOut)a, f(DevOut)b and f(DevOut)c), such that the set Bloom filter 206 is representative of the search inputs 155*a*, 155*b* and 155*c*. Therefore, it will be appreciated that the Bloom filter 206 is representative of the search data comprising, for example, the device capability identifiers and device type identifiers. It will also be appreciated that, when the varying values and/or secret data are included in the search input 155, the Bloom filter 206 will be representative of the search data 150, the varying values 185 and/or secret data 190.

The Bloom filter 206 may be generated and set on the IoT device 20 on receiving the broadcast 125 or may be pre-computed and stored in memory thereon.

On receiving the broadcast 125 the IoT device 20 uses the hash values f(AgOut)a, f(AgOut)b, f(AgOut)c to query the Bloom filter 206, which in the present example comprises the query data.

Furthermore, it will be appreciated that that when querying a Bloom filter, the IoT devices may be configured to ignore over-saturated filters (e.g. where a set Bloom Filter is overwhelmingly "1"s).

For example, the IoT device 20 may ignore broadcasts comprising a Bloom filter from agent device 1 when the number of bits set to "1" in the Bloom filter array is above a threshold e.g. 50%. Such functionality will prevent "catch-all" searches designed to derive a response from the IoT device 20, for example in broadcasts from a rogue agent device, without the rogue agent device having knowledge of the secret data or the varying value.

In some examples, the threshold of bits may be determined based on the privileges associated with a secret used to encode e.g. sign the output 120 received in the broadcast from an agent device 1.

For example, if the output 120 is signed by a guest e.g. using Secret1, then the threshold may be set to <50%, whilst if the output is signed by the owner of the infrastructure (e.g. using Secret3), then the threshold may be set to 100%.

Therefore it will be appreciated that the threshold may be set depending on the privileges associated with a particular agent device 1 e.g. as defined by a secret which the agent device 1 uses to sign the output 120.

In some examples, a secret-id can be part of the search request to enable signature verification with the correct signature key. Depending on the signature ID more or less bits can be used in the search request.

In an illustrative example of the functionality described above, IoT device 20 may be a tag which is physically attached to or embedded within an item of property of the user. The tag may be registered as being attached to the particular item of property and may have a device identifier e.g. <"Jack's_Mobile_Phone"> stored thereon.

If the item becomes misplaced, the user may cause an agent device which the user has possession of, to broadcast a communication comprising search data having the device identifier <"Jack's_Mobile_Phone"> by pressing a button on the device, whereby the search data will be transformed and broadcast as described above.

If the tag is within range it will receive the broadcast and will issue a signal to the agent device to indicate to the agent device that it has the device identifier matching the search data.

The signal may be an iBeacon™ signal, which will allow a user to identify the location of the tag and therefore, the misplaced item of property e.g. via an application running on the agent device.

Such tags may be provided with secret data and a constantly varying value generator as described previously. The iBeacon signal may be used by an application running on the agent device to provide the user with a map showing the precise location of the property.

In some embodiments, IoT devices may comprise a hardware unit, for example a radio RX state machine, configured to receive broadcasts and query bloom filters within the broadcasts, whereby the RX state machine may activate a processing core within the IoT device only on receiving a Bloom filter representative of data stored within the IoT device.

Although illustrative embodiments have been described in detail herein with reference to the accompanying drawings, it is to be understood that the embodiments are not limited to those precise embodiments, and that various changes and modifications can be effected therein by one skilled in the art.

In a first aspect there is provided a method of scanning for a remote device, the method comprising: generating, at a data processing device, a search input; transforming, at the data processing device, the search input to provide a transformed output, wherein the transformed output is representative of the search input; transmitting, a communication comprising the transformed output from the data processing device to the remote device; receiving, at the data processing a device, a communication from the remote device based on the transformed output.

The method may further comprise, transforming the search input may comprise performing at least one hash function, wherein the transformed output may comprise at least one hash value representative of the search input, wherein the hash function may comprise a one-way hash function.

The search input may comprise search data, wherein the search data may correspond to device identifiers associated with the remote device.

The search input may be representative of a varying value, wherein the varying value may comprise a UNIX time value and/or the search input may be representative of secret data.

The transformed output may comprise a Bloom filter, wherein bit values of the Bloom filter may be set based on the at least one hash value representative of the search input.

The method may further comprise: determining, based on the communication from the remote device, whether the remote device comprises data corresponding to the search input.

The method may further comprise: determining, at the data processing device, whether the remote device is an authorised device.

The method may further comprise: encoding, at the data processing device, the transformed output with a secret shared with the remote device, and wherein the secret may define privileges associated with the data processing device.

In a further aspect there is provided a data processing device comprising: processing circuitry configured to perform data processing; and communication circuitry configured to communicate with a remote device; wherein the processing circuitry may be configured to generate a search input; transform the search input to provide a transformed output, wherein the transformed output is representative of the search input; and transmit the transformed output from the data processing device to the remote device.

In a further aspect there is provided a method of scanning for a remote device, the method comprising: receiving, at the remote device, a communication comprising a transformed output from a data processing device; obtaining, at the remote device, query data; comparing, at the remote device, the query data with the transformed output; transmitting a communication to the data processing device based on the comparison.

Obtaining the query data may comprise: generating, at the remote device, a search input; transforming, at the remote device, the search input to provide the query data, wherein the query data is representative of the search input.

Transforming the search input may comprise performing at least one hash function, wherein the query data comprises at least one hash value representative of the search input.

The method may further comprise: setting, at the remote device, bit values of a Bloom filter based on the at least one hash value representative of the search input.

The method may further comprise, setting, at the remote device, bit values of the Bloom filter based on the at least one hash value representative of the search input.

The transformed output may comprise at least one hash value and/or a Bloom filter Obtaining the query data may comprise: obtaining the query data from a storage element associated with the remote device, wherein the query data from the storage element may comprise a set bloom filter.

Comparing the query data with the transformed output may comprise: verifying values of bit positions of the set Bloom filter using the at least one hash value of the transformed output.

Comparing the query data with the transformed output may comprise: verifying values of bit positions of the Bloom filter of the transformed output using the at least one hash value of the at least one hash functions.

The search input may comprise remote device data, wherein the remote device data comprises remote device identifiers.

The search input may be representative of a varying value associated with the remote device, wherein the varying value may comprise a UNIX time value.

The search input may be representative of secret data associated with the remote device.

The transformed output may comprise data representative of the search data generated at the data processing device, a time varying value associated with the data processing device and/or secret data stored on the data processing device.

The secret data associated with the remote device may correspond to the secret data stored on the data processing device.

The transformed output may be encoded with a secret.

The method may further comprise: decoding, at the remote device, the encoded transformed output.

In a further aspect there is provided a data processing device comprising: processing circuitry configured to perform data processing; a storage element for storing data; and communication circuitry configured to communicate with a data processing device remote therefrom; wherein the data processing device is configured to: receive a communication comprising a transformed output from the remote data processing device; obtain query data from the storage element; compare the query data with the transformed output; and transmit a communication to the remote data processing device based on the comparison.

The invention claimed is:

1. A method of scanning for a remote device, the method comprising:
   generating, at a data processing device, a search input comprising one or more device identifiers for the remote device;
   transforming, at the data processing device, the search input to provide a search query by performing at least one hash function on the one or more device identifiers of the search input, wherein the search query comprises a Bloom filter and wherein at least one bit values of the Bloom filter is set based on at least one hash value representative of the one or more device identifiers;
   transmitting a communication comprising the search query from the data processing device to scan for the remote device;
   receiving, at the data processing a device, a communication from the remote device based on the search query;
   encoding, at the data processing device, the search query with one or more of: a time dependent signature and a secret.

2. A method according to claim 1, wherein the search input comprises search data.

3. A method according to claim 2, comprising:
   automatically generating the search data in response to a user input.

4. A method according to claim 1, wherein the device identifiers comprise one or more of: a unique device identifier, a device capability identifier and a device type identifier.

5. A method according to claim 1, wherein the device identifiers form a hierarchical chain.

6. A method according to claim 1, wherein the search input is representative of a varying value including one or more of: a UNIX time value and a nonce.

7. A method according to claim 1, wherein the transformed data is representative of secret data.

8. A method according to claim 1, wherein the secret data is applied to the search data.

9. A method according to claim 1, wherein the at least one hash function comprises one of: a HMAC and MAC hash function.

10. A method according to claim 9, wherein the secret data is applied when performing the HMAC or MAC has function.

11. A method according to claim 1, wherein the resulting hash value is split to set the bit values of the bloom filter.

12. A method according to claim 1, the method further comprising: encoding, at the data processing device, the search query with one or more of: a time dependent signature and a secret.

13. A method according to claim 1, the method further comprising: determining, at the data processing device, whether the remote device is an authorized device based on or in response to decoding the communication received therefrom.

14. A method according to claim 1, the method further comprising: transmitting, from the data processing device to the remove device, a command to control the functionality of the remote device.

15. A data processing device comprising:
    processing circuitry configured to perform data processing; and communication circuitry configured to communicate with one or more remote devices;
    wherein the processing circuitry is configured to:
    generate a search input comprising one or more device identifiers;
    transform the search input to provide a search query by performing at least one hash function on the one or more device identifiers of the search input, wherein the search query comprises a Bloom filter, and wherein at least one the bit values of the Bloom filter is set based on at least one hash value representative of the one or more device identifiers;
    transmit the search query from the data processing device to the one or more remote devices to scan for a device having device identifiers matching the one or more device identifiers; and
    encode the search query with one or more of: a time dependent signature and a secret.

16. A method of scanning for a remote device, the method comprising:
    receiving, at the remote device, a communication comprising a search query from a data processing device, wherein the search query comprises a Bloom filter and wherein at least one bit values of the Bloom filter is set based on at least one hash value representative of one or more device identifiers;
    obtaining, from a storage element at the remote device, query data;
    comparing, at the remote device, the query data with the search query;
    transmitting a communication to the data processing device based on the comparison.

17. A method according to claim 16, the method further comprising:
    ignoring, at the remote device, the communication received from the data processing device when the number of bits having a first bit value in the received Bloom filter is above a threshold.

18. A method according to claim 16, the method further comprising:
    verifying, at the remote device, an encoding on the received communication;
    ignoring the received communication when the encoding cannot be verified.

19. A method according to claim 18, wherein verifying the encoding comprises:
    verifying the encoding across multiple time windows.

20. A method according to claim 16, wherein the query data is representative of a varying value associated with the remote device.

21. A method according to claim 20, wherein the varying value comprises a UNIX time value.

22. A method according to claim 16, wherein the search query is representative of secret data associated with the remote device.

23. A method according to claim 16, the method further comprising:

encoding, at the remote device, the communication with one or more of: a time dependent signature and a secret.

24. A data processing device comprising:
processing circuitry configured to perform data processing; a storage element for storing data; and
communication circuitry configured to communicate with a data processing device remote therefrom;
wherein the data processing device is configured to:
  receive a communication comprising a search query from the remote data processing device, wherein the search query comprises a Bloom filter and wherein at least one bit values of the Bloom filter is set based on at least one hash value representative of one or more device identifiers;
obtain query data from the storage element;
compare the query data with the search query;
transmit a communication to the remote data processing device based on the comparison; and
encode the search query with one or more of: a time dependent signature and a secret.

* * * * *